United States Patent [19]
DiMatteo et al.

[11] 4,443,705
[45] Apr. 17, 1984

[54] METHOD FOR LOCATING POINTS ON A THREE-DIMENSIONAL SURFACE USING LIGHT INTENSITY VARIATIONS

[75] Inventors: Paul DiMatteo, Huntington; Joseph Ross, Fort Salonga, both of N.Y.

[73] Assignee: Robotic Vision Systems, Inc., Hauppauge, N.Y.

[21] Appl. No.: 432,267

[22] Filed: Oct. 1, 1982

[51] Int. Cl.$^3$ .............................................. G01B 11/24
[52] U.S. Cl. ..................................... 250/558; 356/2; 356/376
[58] Field of Search ........ 250/558; 356/1, 2, 375–376, 356/379–380, 152

[56] References Cited

U.S. PATENT DOCUMENTS

3,749,493  7/1973  Macovski ................................. 356/2
4,185,918  1/1980  DiMatteo et al. ............... 250/558 X
4,269,513  5/1981  DiMatteo et al. ............... 250/558 X Primary Examiner—David C. Nelms
Assistant Examiner—Edward P. Westin
Attorney, Agent, or Firm—Max Fogiel

[57] ABSTRACT

A method for locating points on a surface, in which the surface is irradiated selectively with an irradiating volume which has a varying intensity that defines a first pattern. After irradiating the surface with the first pattern, the surface is irradiated similarly with volume(s) having varying intensity(ies) defining a second (or more) pattern(s). Both (or all) of these patterns are applied to a point to be located on the surface. The radiation impinging on the surface is recorded by a camera which forms images of these patterns. The images are scanned to find the intensities of the point in the two (or more) patterns. The location of the point on the surface is dependent on a predetermined ratio or difference of the intensities of the point in the two (or more) patterns. The patterns may be linear, sinusoidal, smooth, non-smooth and/or two dimensional functions ultimately producing a single valued ratio or difference result.

15 Claims, 10 Drawing Figures

FIG. 7A $t_1$ = PERIOD OF TIME FOR OPAQUE MASK TO TRAVEL ACROSS PROJECTED PATTERN.

METHOD FOR LOCATING POINTS ON A THREE-DIMENSIONAL SURFACE USING LIGHT INTENSITY VARIATIONS

BACKGROUND OF THE INVENTION

The present invention is concerned with a method for defining a three-dimensional object in space by locating points on the surface of that object. The three-dimensional locations of the points is determined by irradiating the surface with varying light intensities and measuring the differences and/or ratios of the light intensities.

In the past, the three-dimensional locations of points on a surface was achieved using digital methods which are described in a number of related patents. In the present invention, analog irradiated light patterns are used with or without such previous digital methods. The analog irradiated light patterns used in the present invention allow for infinitesimal resolution in finding the locations of points on a surface, in contrast with the previous digital methods in which the resolution was limited to a predetermined discrete section or area.

RELATED CROSS-REFERENCES

The following U.S. Pat. Nos. may be referred to for development of the art for locating points on a three-dimensional surface: 4,145,991 3,866,052 4,175,862 4,185,918 4,259,589 4,269,513

SUMMARY OF THE INVENTION

It is an object of the present invention to define the locations of points on a three-dimensional surface using light patterns of varying intensities to analyze the surface.

Another object of the present invention is to provide the foregoing method with analog irradiated light patterns which may be used with or without digital methods of the prior art.

A further object of the present invention is to provide a method as described, in which the analog light patterns allow for infinitesimal resolution in determining the location of the points on a surface.

The objects of the present invention are achieved by irradiating a surface selectively with patterns of light having varying intensities. In any pattern of light the varying intensities define a first pattern.

After the surface has been irradiated with the first pattern, the same surface is subjected to a second irradiating pattern having varying intensities defining a second pattern. The two patterns are arranged so that when superimposed on one another they will form into sections. A point on the surface is uniquely located by correlating the two patterns with respect to the point.

Images of the patterns are recorded by a camera, and these images are scanned to find the light intensities of the point in the two patterns. By noting the relative intensities of the point and forming a ratio of the two intensities, the projector angle of the point may be uniquely defined. The projector angle of the point can also be defined by taking differences (i.e., subtractions) of the two light intensities of the point in the two patterns provided that the reflectivity of the measured surface is sufficiently uniform to provide the data to the accuracy required. Once the projector angle is known, methods of the prior art may be employed to solve for the 3-D position of said point.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Referring to the drawings, the surface 12 of an object 10 is irradiated with volumes of light 14 emitted by a projector 16. (Reference FIGS. 1 and 1A). A camera 18 records images of the volumes of light as they impinge on the surface 12.

Figure 1:
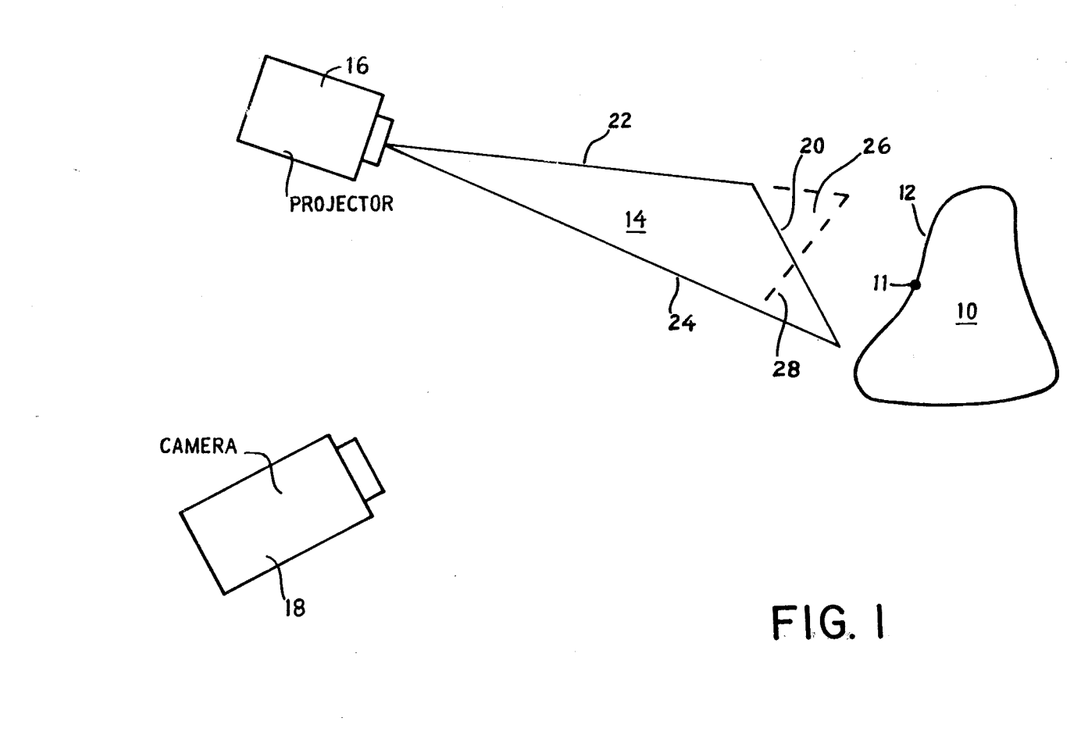
FIG. 1 is a schematic top (Plan) view of an arrangement in which a surface is analyzed by the application of volumes of light of varying intensities, in accordance with the present invention.
Figure 1A:
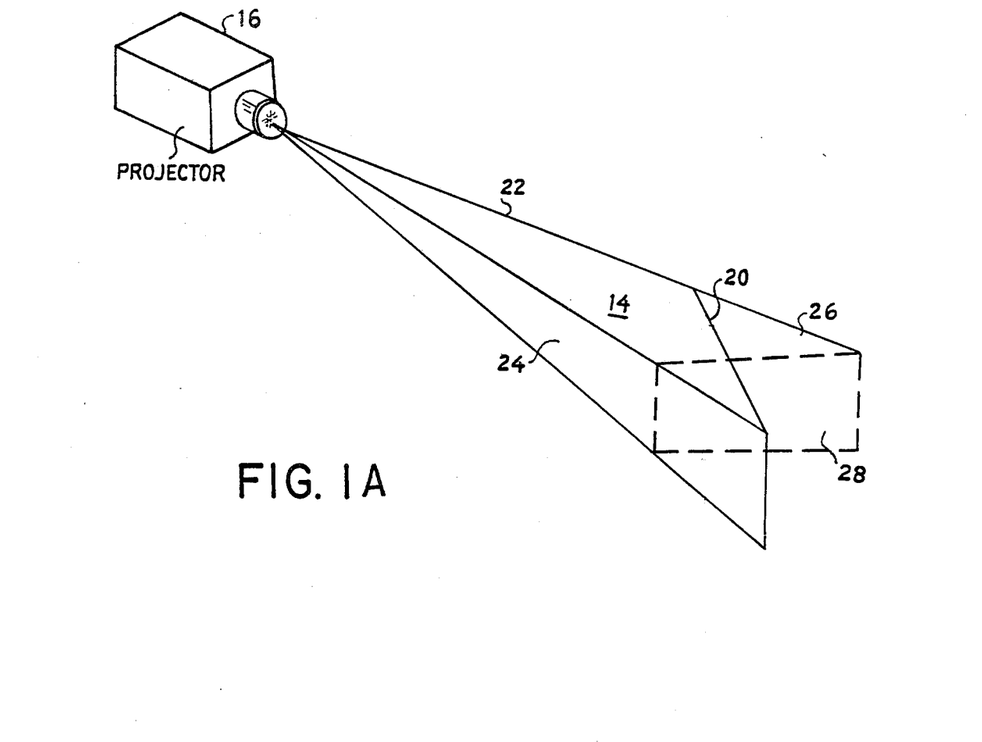
FIG. 1A is an isometric view of light volumes and projector shown in FIG. 1.

To illustrate that the intensity of light within the impinging volume 14 varies throughout this volume, the edge 20 of this volume facing the object 10 has been given an inclination as shown in FIGS. 1 and 1A. The inclination is intended, for example, to represent that the light intensity varies from low intensity at the edge 22 to high intensity at the edge 24. In the configuration shown in FIGS. 1 and 1A, the varying intensity of the pattern is denoted to be a linear or straight-line variation 20.

If only one such light volume 14 is applied to the surface 12 and directed to a point 11 thereon, the location of the point is not uniquely defined. In order to obtain unique results, it is essential to irradiate the same point on the surface with another volume of light 26 illustrated by dashed lines in FIG. 1 and FIG. 1A.

The intensity variation of the volume 26 is made opposite to the volume 14. This is represented by the edge shown in dashed lines 28. Thus, whereas the intensity is low along edge 22 in volume 14, the intensity in volume 26 is high along edge 22, and conversely the intensity is low in volume 26 along line 24 in contrast to the high intensity in volume 14.

Figure 2:
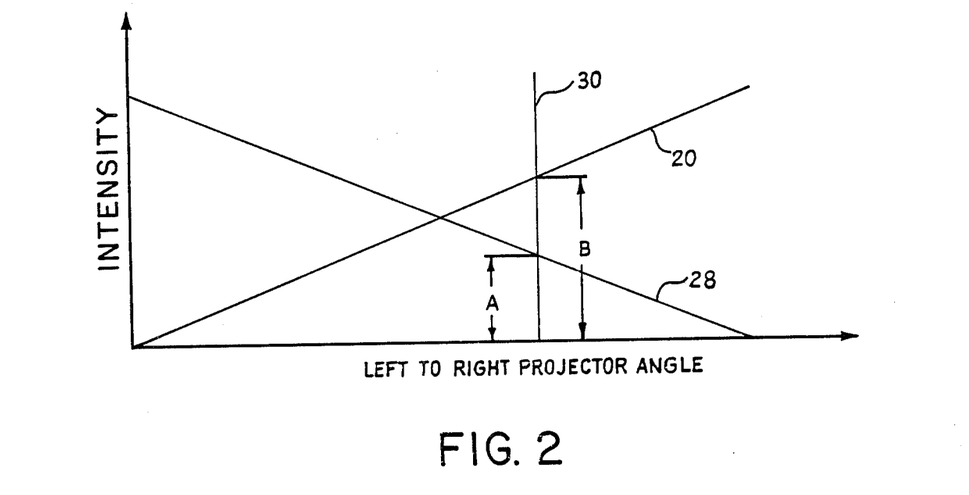
FIG. 2 is a graphical representation of linear light intensity functions, and the measurement of these functions to obtain locating information for a point on the surface.

When the light intensity variations represented by 20 and 28 are graphically plotted, they appear as shown in FIG. 2. If the point 11 to be located lines at the distance 30 along the surface, then the projector angle of this point is uniquely determined by taking the ratio A/B. This angle applied with the prior art is sufficient to calculate the 3-D location of the point. Depending on the character of the surface, the difference between these two parameters A-B may also be taken to obtain the angular location of the point.

Thus, in the arrangement of FIGS. 1, 1A and 2, the projector applies two straight lined or "proportional" signals in sequence to the surface to be analyzed. Assuming the absence of room light or cross talks, the ratio of the light intensities at a point on the three-dimensional object illuminated by the two projector outputs, is an indication of the angle of a measurement plane emanating from the projector. This projector angle is used as in the digital methods of the prior art to calculate the three-dimensional position of the point 11 on the surface.

It is not essential that the projector output signals have uniform slopes although the method, when employing horizontal variation of intensity and intensity differences to determine the projector angle, is adversely affected by vertical intensity variation. Instead, it is necessary only that the emitted intensities have calibrated single-valued ratios or differences. The ratio of the two intensities that are measured, may then be referred to in a calibrated reference table to obtain the angle. The ratios which are obtained, are not affected by surface reflectance or vertical intensity variation. For surface reflectance independence the various light patterns must be of the same spectral composition and emanate from a single projector node.

It is necessary to have single valued functions to obtain unique locations. However, as in the prior art, multiple valued patterns can be used for fine grain resolution and the ambiguity of multiplicity resolved by coarser grain patterns.

If the room light is present on the object being analyzed, a third image may be taken by the camera and the room light intensity as recorded by that image may be subtracted from the previous two intensities A and B in FIG. 2 to obtain the desired ratio as follows:

$$\text{RATIO} = \frac{A - \text{BACKGROUND INTENSITY}}{B - \text{BACKGROUND INTENSITY}}$$

Whereas the taking of ratios of intensities will produce the necessary results in defining uniquely the projector angle to a point in space, it is also possible to take only the differences of the intensities in some cases, depending on the geometrical character of the surface being analyzed. However, the method in which ratios of the intensities are taken will produce generally superior results to the method in which the differences of intensities are taken.

It is necessary to have a surface that does not introduce false difference information if only differences of intensity are to be used. For example, rapidly varying surface reflectivity (from texture, color, angle of incidence, etc.) will introduce false difference values. However, it may still be possible to extract information although, most likely of less accuracy.

The method of the present invention may also be used with a projector in which two or three calibrated color signals are used. Such a method provides for increased speed in analyzing a surface, and may provide also for mechanical simplicity.

The increased speed may be obtained by parallel processing. The multiple colors may be projected simultaneously and separately by filters at the camera(s) to obtain the separate pattern information.

Figure 3:
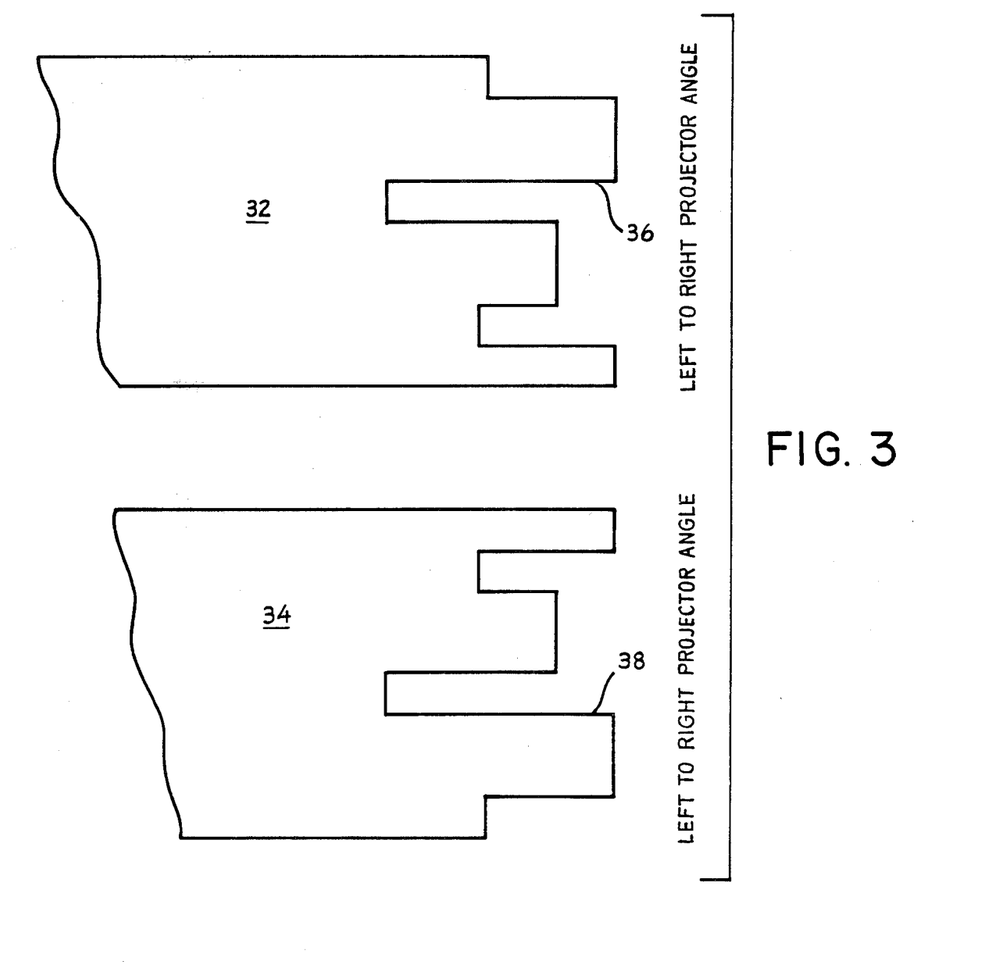
FIG. 3 is a graphical representation of non-smooth functions which may be used in the method of the present invention.

As already noted, it is not essential that the light intensity pattern provide a linear pattern 20 and 28 as shown in FIGS. 1 and 1A. Instead, the light pattern may, for example, be used as shown in FIG. 3. In the arrangement of FIG. 3 the light intensity pattern 32 has a sharply varying contour 36 in contrast to the linear or proportional contour 20. In conjunction with the volume 32, the second volume 34 is provided with a pattern 38 which is precisely the inverse of the pattern 36 for simplicity. The second volume of light need not be the inverse of the first pattern.

Thus, as shown by FIG. 3, it is not essential that the projector output be a smooth function. In general, any function can be used provided it has a ratio which is a single-valued function.

Figure 4:
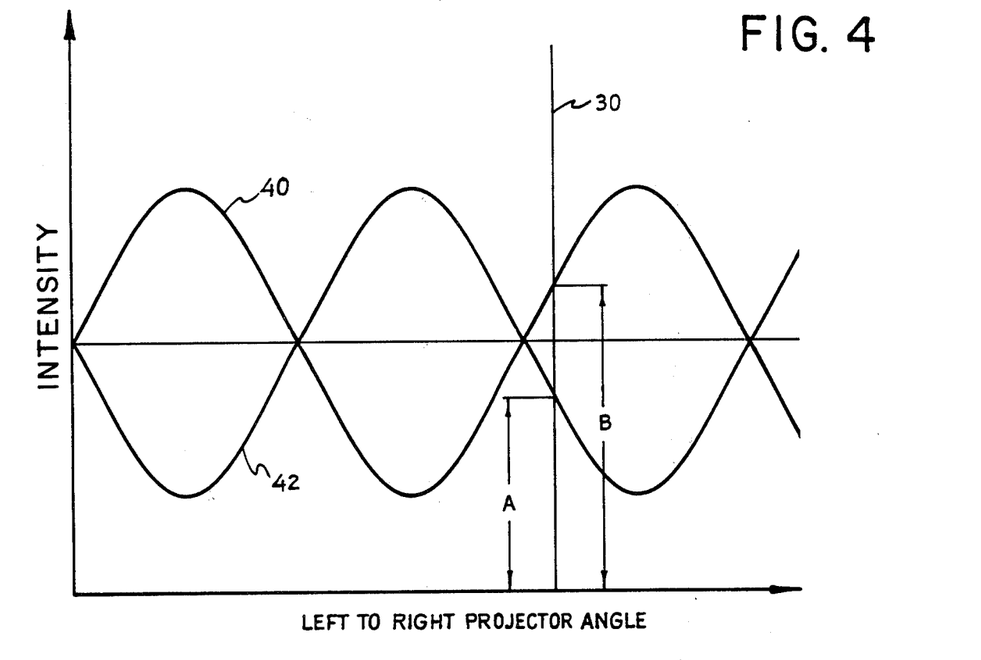
FIG. 4 is a graphical representation of sinusoidal functions which may be used in the method of the present invention.

Smooth functions are generally easier to deal with than functions that are not smooth as shown in FIG. 3, and accordingly sinusoidal functions shown in FIG. 4 are applicable for this purpose. In FIG. 4, for example, the first intensity pattern is represented by the sinusoidal wave 40, whereas the inverse intensity pattern is represented by the sinusoidal wave 42. (In this case A and B become equal several times at crossing points and beyond $2\pi$ angle.) The two waves can also be arranged so that one wave has a period which is either longer or shorter than the other wave. The projector angle of the point at a position 30 along the surface is again determined by the ratio A/B.

Thus, sine and cosine waveforms may be used in various combinations to obtain the desired results.

Figure 5:
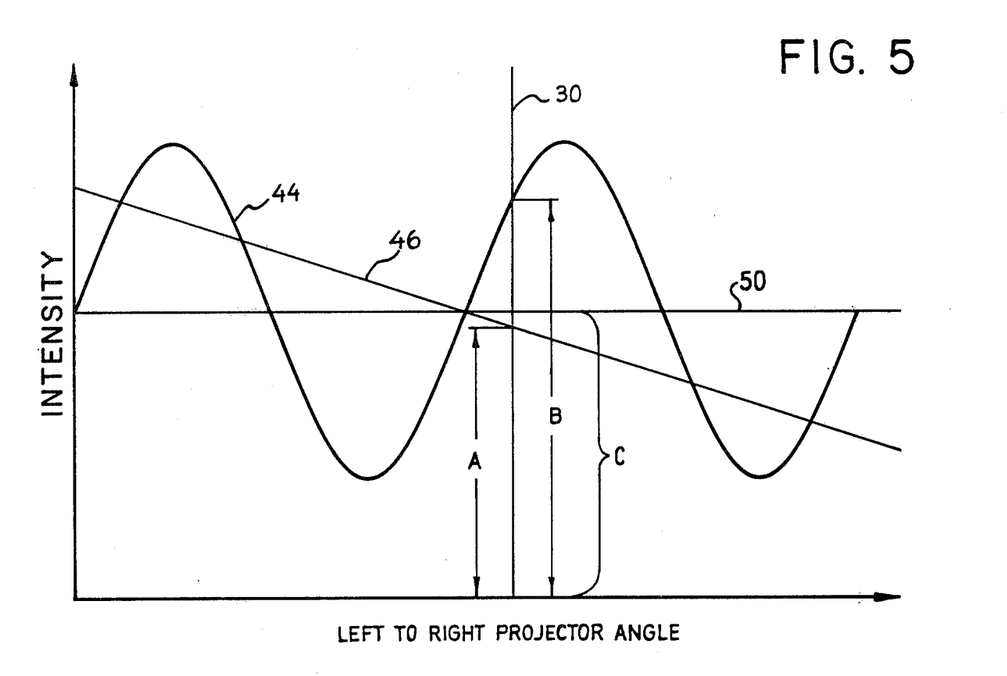
FIG. 5 is a graphical representation of the use of a sinusoidal function in combination with a linear function in the method of the present invention.

It is also possible to use a sinusoidal wave pattern in the first volume, a linear intensity pattern in a second volume and a constant amount of light in a third volume as shown in FIG. 5 by the waveforms 44, 46 and 50 respectively.

In this case projector angle can be found by using ratios A/C and B/C as found in FIG. 5 as address arguments for finding projector angle in a look up table.

Figure 6:
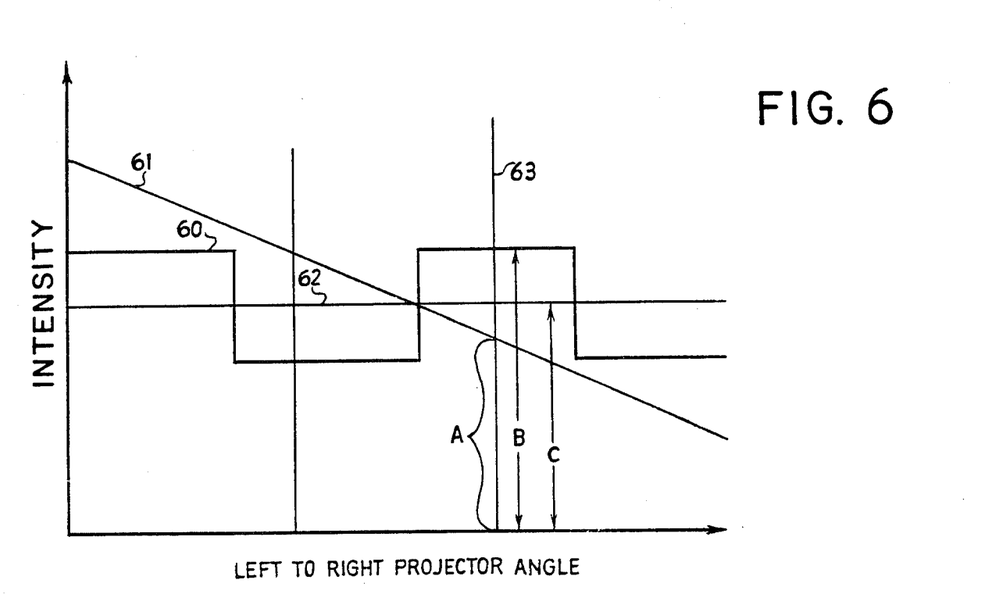
FIG. 6 is a graphical representation of the use of a digital function in combination with a linear function in the method of the present invention.

It is also possible to use a digital wave pattern in the first light volume and a linear intensity pattern in the second volume and a constant amount of light in a third pattern as shown in FIG. 6 by waveforms 60, 61 and 62 respectively. In this case projector angle can be found by using Ratios A/C and B/C found in FIG. 6 as address arguments for finding projector angle in a look up table.

In another embodiment of the present invention, the light projector may be moved along the surface while the light intensity is varied. On the other hand, the light intensity may be held constant while the light projector is moved along the surface at variable speed. The variation in speed can be carried out by applying mechanical rotation or using a mask having an LCD or PZLT array.

Figure 7:
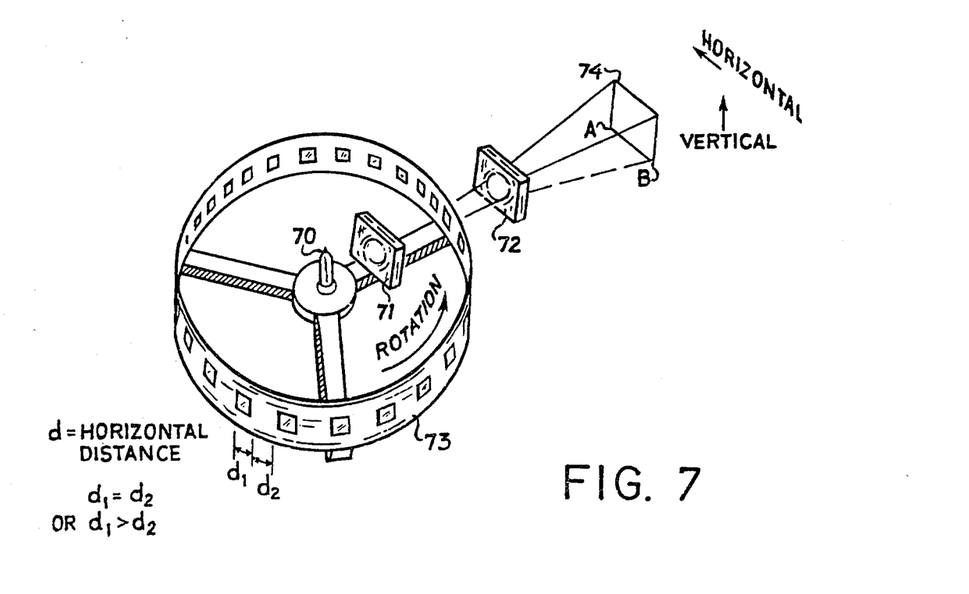
FIG. 7 is a drawing depicting a method of generating volumes of light with intensity varying linearly in the horizontal direction as shown in FIGS. 1 and 1A.
Figure 7A:
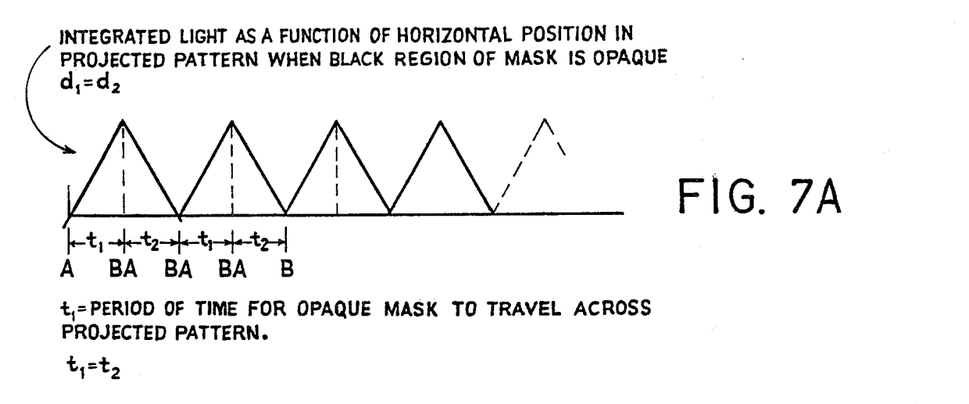
FIG. 7A is a graphical representation of integrated light as a function of horizontal position in projected pattern under condition of rotating mask regions.

In another embodiment of the present invention, a projector constructed as shown in FIG. 7 can transmit approximately linear sloped intensity volumes as shown in FIGS. 1 and 1A. Light source 70 transmits light and part of this light is collected by condenser lens 71 and transmitted to focal plane mask 73. Light passing through mask 73 is focused by projector lens 72 to the focused pattern region 74. Details of building such a projector is well understood by those skilled in optical system design. The unique feature of this projector arrangement is that it generates approximately the waveform shown in FIGS. 1 and 1A. Deviations in the output of FIGS. 1 and 1A can be tolerated by calibration. To generate this waveform the rotating mask 73 chops the light while a camera integrates the light output which is low on one side of the volume and high on the other side of the volume, while the chopped output is going from off to on. The opposite waveform is generated while the chopped output goes from on to off. The combined waveform being illustrated in FIG. 7A.

Figure 7B:
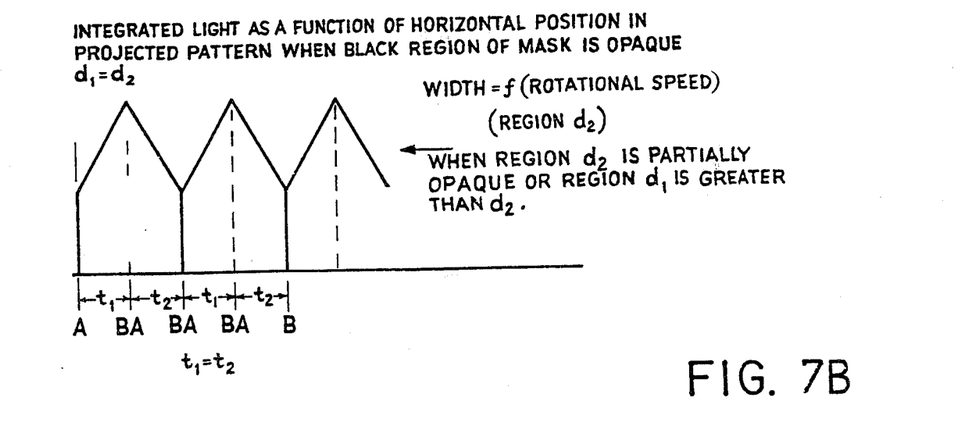
FIG. 7B is a graphical representation similar to FIG. 7A under another condition of rotating mask regions.

A constant amount of light can be added to each camera picture as illustrated in FIG. 7B. This may be necessary to ensure sufficient signal strength to reliably process. Two methods disclosed by this invention are:

1. When region d1=d2 and region d2 is only partially opaque.
2. When region d1>d2. Opaque region d2 is made just wide enough to equal the focal plane aperture width so that the light is completely blocked.

Open region d1, being wider than the aperture width will allow additional light to pass.

When carrying out the method in accordance with the configuration in FIGS. 1 and 1A, in which volume 14 has light intensity varying in a horizontal direction, the camera 18 is displaced horizontally and angled such that its in-focus view coincides with the projected light at the surface to be measured.

An alternate method of providing the horizontally varying light intensity patterns will now be described. It has the particularly advantageous property of enabling more uniform vertical intensity which is necessary for accurate results when using the method of differences of intensities mentioned above.

A horizontal plane of light having the required horizontal light intensity modulation described previously for volumes 14 and 26 in FIGS. 1 and 1A is projected on the surface 12 containing point 11 to be measured. The camera can record the line of intersection of the surface and the plane of light starting parallel to the top of light volume 14 impinging on the surface 12, and thereafter that line is lowered and another photograph is taken by the camera. This procedure of lowering the line and taking a sequential series of photographs would ordinarily be necessary to acquire the necessary projector angle information. To avoid the necessity of taking numerous such photographs by the camera, the present invention provides further that the camera shutter remains open while the line is moved vertically. With this procedure, the camera integrates all these lines and the resulting effect is that the information in an area of the surface is obtained. This procedure also does not require a mask except for the line.

While most of the previous examples deal with varying intensity planes of light (horizontal or vertical) the method is also applicable to two dimension light patterns (checker board patterns, etc.) Neither is the orientation of the system critical to the essence of the invention although the camera and projector orientation within the invention is critical.

Further, it is possible to remove ambiguities such as those caused by reflections, by recording the same light patterns with a camera from a different aspect angle and then rejecting all measured values that the processed data from the two cameras do not agree to lie at the same physical location.

Without further analysis, the foregoing will so fully reveal the gist of the present invention that others can, by applying current knowledge, readily adapt it for various application without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for determining projector angles to points on a surface comprising the steps of: irradiating selectively a surface with irradiating volumes having varying intensities defining a first pattern; irradiating said surface with irradiating volumes having varying intensities defining at least a second pattern, a point to be located on the surface being irradiated by said first and second patterns; recording images of said patterns; and scanning said images to find the intensities of said point in the two patterns; determination of projector angle to said point of the surface being dependent on a predetermined algebraic function of the intensities of said point in the two patterns, said point having a possible location where the recorded images have unequal values as well as at a possible location where the recorded images have equal values.

2. A method as defined in claim 1, wherein said first pattern and said second pattern are linear functions.

3. A method as defined in claim 1, wherein said algebraic function is a ratio of the intensities of said point in said two patterns.

4. A method as defined in claim 1, wherein said algebraic function is the difference of the intensities of said point in said two patterns.

5. A method as defined in claim 1, wherein said first pattern is a sinusoidal function and said second pattern is a linear function.

6. A method as defined in claim 1, wherein said first pattern and said second pattern are sinusoidal functions displaced in phase.

7. A method as defined in claim 1, wherein said first pattern and said second pattern are sinusoidal functions of different frequencies.

8. A method as defined in claim 1, wherein said first pattern and said second (or more) pattern(s) are non-smooth functions.

9. A method as defined in claim 1, wherein said images of said patterns are recorded by a camera with a shutter, and moving said patterns while holding open the shutter of the camera.

10. A method as defined in claim 1, wherein said first pattern and said second pattern are two dimensional functions.

11. A method as defined in claim 1, wherein said first pattern is a digital pattern and said second pattern is a linear function.

12. A method as defined in claim 9, wherein said images of said patterns are created by a horizontal light pattern contained in a line of light which is moved vertically while the camera shutter is either opened for each vertical position of the line or left open to permit integration of the line positions, thereby creating a controlled horizontal light intensity variation without vertical intensity variation.

13. A method as described in claim 9, wherein said images of said patterns are created by moving a uniformly illuminated vertical line of light horizontally at a constant rate while the projector changes the brightness of the line of light and the camera integrates the surface image.

14. A method as described in claim 9 wherein the brightness is kept constant and the rate of travel changes to effect the amount of light integrated by the camera.

15. A method as described in claim 9 wherein said images of said patterns are created by moving an at least partially opaque shutter in the projector focal plane such that the integrated light varies in a controlled manner from one side of the light volume to the other.

* * * * *